No. 843,860. PATENTED FEB. 12, 1907.
A. J. BALDWIN.
APPARATUS FOR MAKING SHEET GLASS WITH OR WITHOUT AN EMBEDDED STRENGTHENING STRUCTURE.
APPLICATION FILED JULY 21, 1905.

UNITED STATES PATENT OFFICE.

ARTHUR J. BALDWIN, OF EAST ORANGE, NEW JERSEY.

APPARATUS FOR MAKING SHEET-GLASS WITH OR WITHOUT AN EMBEDDED STRENGTHENING STRUCTURE.

No. 843,860.        Specification of Letters Patent.        Patented Feb. 12, 1907.

Application filed July 21, 1905. Serial No. 270,604.

*To all whom it may concern:*

Be it known that I, ARTHUR J. BALDWIN, a citizen of the United States, residing at East Orange, in the county of Essex and State of New Jersey, have invented certain new and useful Improvements in Apparatus for Making Sheet-Glass with or without an Embedded Strengthening Structure, of which the following is a specification, reference being had to the drawings accompanying and forming a part of the same.

My invention relates to glass-working machines, and has for its object to provide a simple and effective apparatus for making sheets or plates of glass of the ordinary kind and also sheets having a strengthening structure embedded therein, the latter product being known generally as "wire-glass."

The invention will be more clearly understood in connection with the accompanying drawings, in which—

Figure 1:
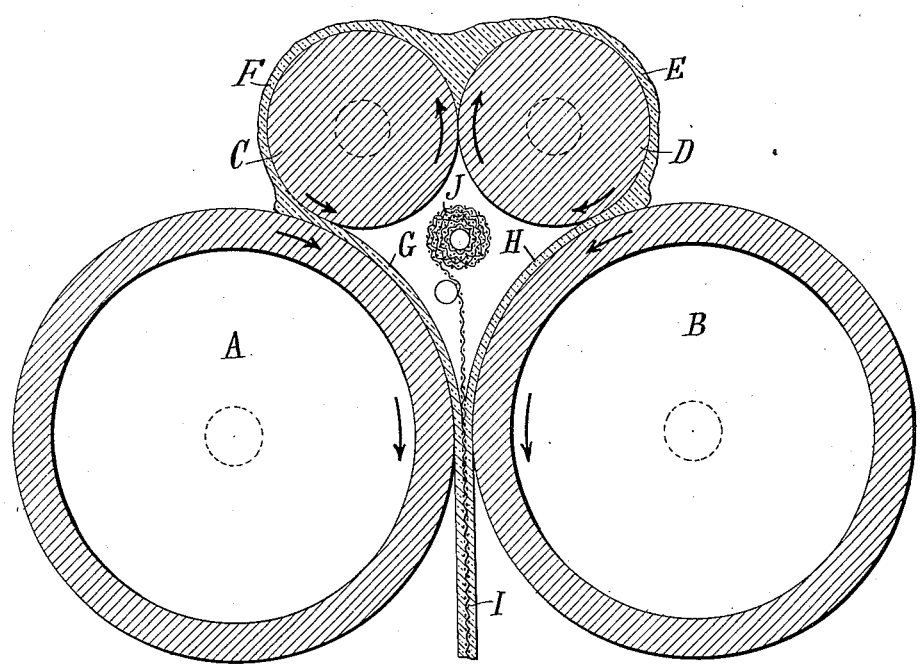
Figure 2:
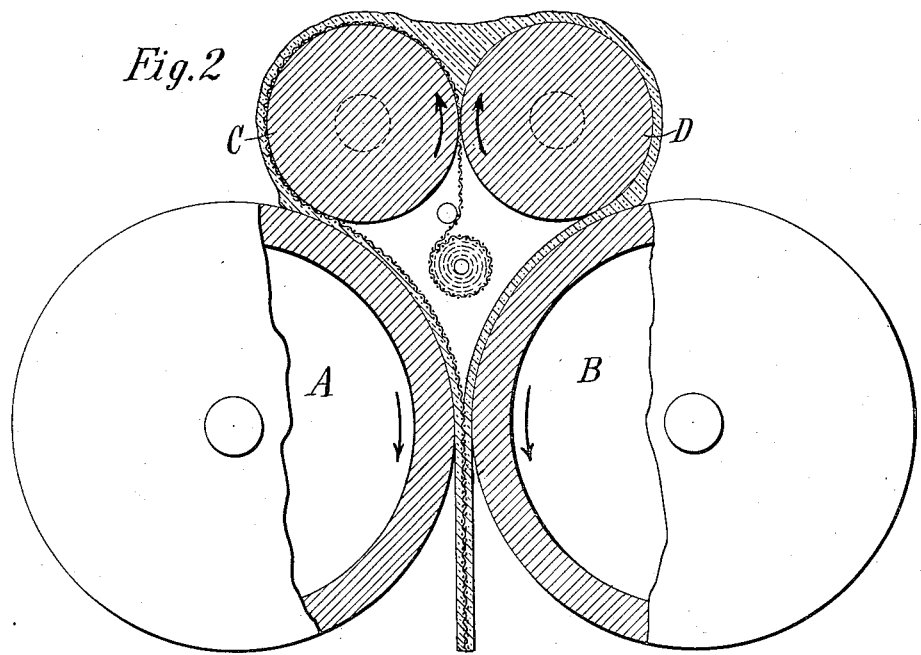

Figure 1 is a sectional view of a convenient embodiment, showing the same used for making wire-glass. Fig. 2 is a similar view of the same machine, but showing a different method of utilizing the wire fabric therein.

The rollers A and B are arranged to rotate in the direction of the arrows at the same peripheral speeds and are spaced apart a distance equal to the thickness which it is desired that the finished sheet of glass should have. Above the two rollers just mentioned are rollers C and D in engagement with each other and rotating in the direction of the arrows at the same peripheral speed as the rollers A and B. The roller C is spaced from the roller A a distance equal to at least one-half the thickness of the finished sheet, and roller D is spaced from its coacting roller B by the same amount.

The operation of the machine is as follows: A mass of plastic glass is deposited between the rollers C and D either before or after the same are set in motion. The rotation of these rollers causes them to carry on their surfaces films or layers of glass E F, drawn from the mass of glass between them. These layers are carried down between the upper rollers and the lower rollers and are thereby formed into sheets or layers G H, each constituting a half of the finished sheet. The weight of these sheets or layers causes them to leave the rollers C D, and they are therefore carried downward by rollers A B, and between the latter are formed into a single sheet I. The latter may be received by any suitable devices (not shown) and given such further treatment, as annealing, as may be needed.

If it is desired that the sheet I have a wire-mesh fabric embedded in it, a roll of such fabric, as J, is introduced into the space between the four rollers, and the end of the fabric is carried down until it is engaged between the layers G and H, whereupon the further movement of these layers draws the fabric off of the reel, and the said layers are then applied to the opposite sides of the fabric by the operation of the rollers A and B, so that the fabric is embedded in the finished sheet I.

Instead of carrying the fabric directly down between the rollers A B it may be made first to pass up between the rollers C and D, as shown in Fig. 2, and pass over one or the other, thereby being applied to the inner surface of the layer or film of glass carried by such roller. The other layer of glass on the other roller is then applied to the fabric-bearing surface of the first by the action of the rollers A B in the manner already described. This method of applying the wire fabric is of particular advantage, inasmuch as in passing through the rollers C and D it is flattened out and all irregularities of its surface removed, whereas in the method illustrated in Fig. 1 it will generally be found necessary to give the fabric a preliminary flattening or smoothing before it is formed into the roll J, so that when embedded in the sheet by the rollers A and B it will be located at the same distance from the surfaces of the sheet throughout its entire extent.

With the rollers C and D each separated from its coacting roller A and B an amount equal to one-half the thickness of the finished sheet the wire fabric will be embedded at the center of the latter; but if one or the other of the first rollers be closer to its coacting lower roller while the other is proportionately farther from its coöperating roller the wire fabric will in the finished sheet be located nearer to one surface thereof, as will be readily understood.

I have not shown any particular means for supporting the roll of wire fabric J, since any convenient devices for this purpose may be employed.

The apparatus herein shown and described is merely one embodiment of my invention, and the same may be embodied in a variety of forms without departure from its proper scope.

What I claim is—

1. In a machine of the kind described, the combination of a pair of rollers coöperating with each other, and a pair of rollers above the first, coöperating with each other, and each arranged to coöperate with its adjacent roller of the first pair, as set forth.

2. In an apparatus of the kind described, the combination of a pair of spaced rollers coöperating with each other, and a pair of rollers above the first pair, coöperating with each other, and each arranged to coöperate with its adjacent roller of the first pair and spaced therefrom a less distance than the space between the rollers of the first pair, as set forth.

ARTHUR J. BALDWIN.

Witnesses.
S. S. Dunham,
Edward T. Magoffin.